(12) United States Patent
Rodgers et al.

(10) Patent No.: US 7,402,616 B2
(45) Date of Patent: Jul. 22, 2008

(54) FUSIBLE CONDUCTIVE INK FOR USE IN MANUFACTURING MICROFLUIDIC ANALYTICAL SYSTEMS

(75) Inventors: James Iain Rodgers, Lochardil (GB); Margaret Maclennan, Culloden (GB); James Moffat, Inverness (GB); Alan McNeilage, Inverness (GB)

(73) Assignee: Lifescan, Inc., Milpitas, CA (US)

(*) Notice: Subject to any disclaimer, the term of this patent is extended or adjusted under 35 U.S.C. 154(b) by 560 days.

(21) Appl. No.: 10/957,470

(22) Filed: Sep. 30, 2004

(65) Prior Publication Data

US 2006/0074143 A1 Apr. 6, 2006

(51) Int. Cl.
*C09D 11/00* (2006.01)
*C09D 11/10* (2006.01)

(52) U.S. Cl. .............. 523/160; 523/161; 524/495; 524/496; 524/403; 524/423; 524/548; 524/400; 524/414

(58) Field of Classification Search ............ 523/160, 523/161, 200, 205; 524/495, 496, 400, 414, 524/424, 404
See application file for complete search history.

(56) References Cited

U.S. PATENT DOCUMENTS

| | | | |
|---|---|---|---|
| 5,047,283 A | 9/1991 | Leatherman et al. | |
| 5,707,502 A | 1/1998 | McCaffrey et al. | |
| 5,857,983 A | 1/1999 | Douglas et al. | |
| 5,888,390 A | 3/1999 | Craig | |
| 5,906,723 A | 5/1999 | Mathies et al. | |
| 6,110,576 A | 8/2000 | Decker et al. | |
| 6,176,962 B1 | 1/2001 | Soane et al. | |
| 6,284,113 B1 | 9/2001 | Bjornson et al. | |
| 6,322,736 B1 | 11/2001 | Bao et al. | |
| 6,444,461 B1 | 9/2002 | Knapp et al. | |
| 6,503,359 B2 | 1/2003 | Virtanen | |
| 6,593,398 B2 * | 7/2003 | Breton et al. | 523/160 |
| 6,599,408 B1 * | 7/2003 | Chan et al. | 204/403.15 |
| 6,627,058 B1 | 9/2003 | Chan | |
| 6,990,849 B2 | 1/2006 | Bohm et al. | |
| 7,204,940 B2 * | 4/2007 | McDonald et al. | 252/512 |
| 2002/0076597 A1 * | 6/2002 | Chang et al. | 429/35 |
| 2002/0079219 A1 | 6/2002 | Zhao | |
| 2002/0185183 A1 | 12/2002 | O'Connor et al. | |
| 2002/0189946 A1 | 12/2002 | Walnright et al. | |
| 2003/0010228 A1 | 1/2003 | Lofink | |
| 2003/0029724 A1 | 2/2003 | Derand et al. | |
| 2003/0136509 A1 | 7/2003 | Virtanen | |
| 2003/0203504 A1 | 10/2003 | Hefti | |
| 2003/0230488 A1 | 12/2003 | Lawrence et al. | |
| 2004/0249253 A1 | 12/2004 | Racchini et al. | |

FOREIGN PATENT DOCUMENTS

| | | |
|---|---|---|
| EP | 0352925 B1 | 12/1994 |
| EP | 1367101 A1 * | 12/2003 |
| EP | 1391242 A2 | 2/2004 |
| WO | WO 97/30344 A1 | 8/1997 |
| WO | WO 99/19717 A1 | 4/1999 |
| WO | WO 00/62931 A1 | 10/2000 |
| WO | WO 01/35088 A1 | 5/2001 |
| WO | WO 01/41931 A3 | 6/2001 |
| WO | WO 01/54810 A1 | 8/2001 |
| WO | WO 02/024322 A3 | 3/2002 |
| WO | WO 02/49507 A1 | 6/2002 |
| WO | WO 03/045557 A2 | 6/2003 |

OTHER PUBLICATIONS

European Search Report, Munich, Germany, Nov. 28, 2005, re European Application 05256108.1.

Egloff, E. Ralph, "A Flexible Solution to Solderless Surface Mount", *Adhesives Age*, pp. 16-20 (Dec. 1995).

* cited by examiner

*Primary Examiner*—Sanza L McClendon

(57) ABSTRACT

A fusible conductive ink for use in manufacturing microfluidic analytical systems includes micronised powder containing platinum and carbon, poly(bisphenol A-co-epichlorohydrin)-glycidyl end capped polymer, and a solvent. In addition, the ratio of micronised powder to poly(bisphenol A-co-epichlorohydrin)-glycidyl end capped polymer is in the range of 3:1 to 1:3. The fusible conductive inks can be employed in the manufacturing of microfluidic systems to form electrodes, electrically conductive traces and/or electrically conductive contact pads.

4 Claims, 8 Drawing Sheets

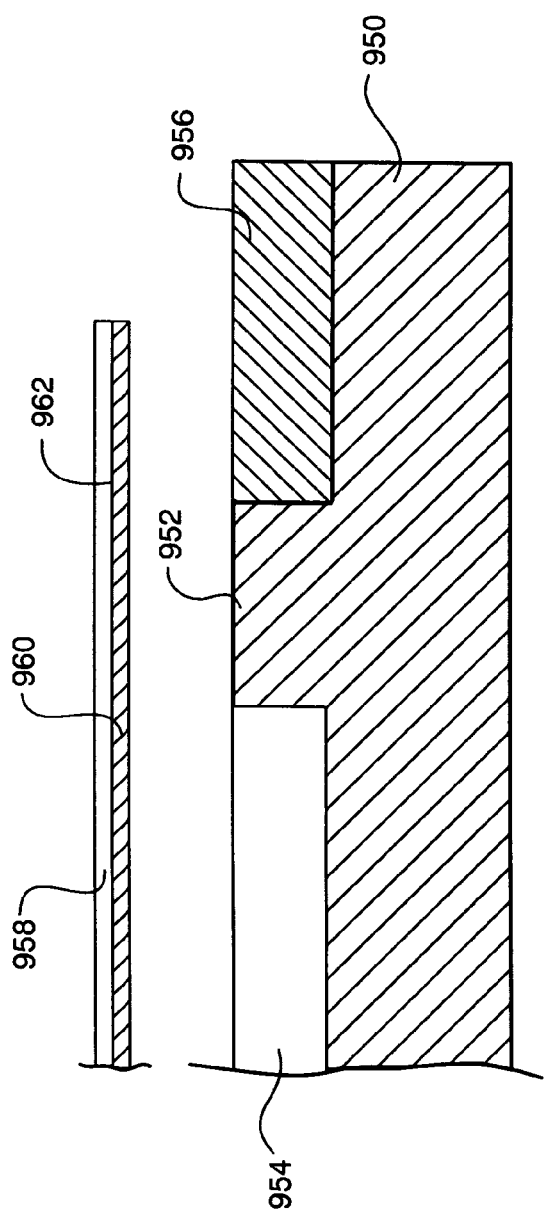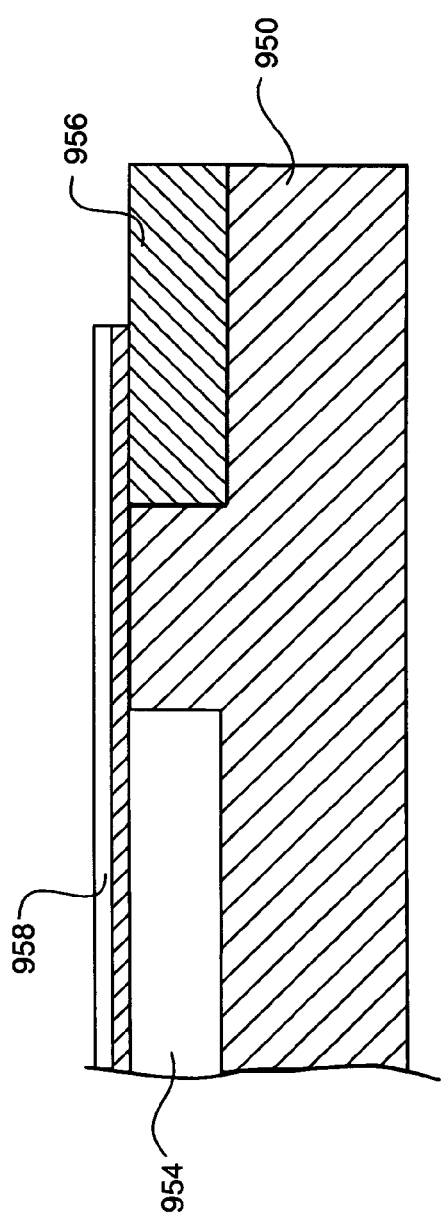
FIG. 9A
FIG. 9B

FUSIBLE CONDUCTIVE INK FOR USE IN MANUFACTURING MICROFLUIDIC ANALYTICAL SYSTEMS

BACKGROUND OF THE INVENTION

1. Field of the Invention

The present invention relates, in general, to analytical devices and, in particular, to materials for use in manufacturing microfluidic analytical systems.

2. Description of the Related Art

In analytical devices based on fluid samples (i.e., fluidic analytical devices), the requisite fluid samples should be controlled with a high degree of accuracy and precision in order to obtain reliable analytical results. Such control is especially warranted with respect to "microfluidic" analytical devices that employ fluid samples of small volume, for example, 10 nanoliters to 10 microliters. In such microfluidic analytical devices, the fluid samples are typically contained and transported in microchannels with dimensions on the order of, for example, 10 micrometers to 500 micrometers.

The control (e.g., transportation, position detection, flow rate determination and/or volume determination) of small volume fluid samples within microchannels can be essential in the success of a variety of analytical procedures including the determination of glucose concentration in interstitial fluid (ISF) samples. For example, obtaining reliable results may require knowledge of fluid sample position in order to insure that a fluid sample has arrived at a detection area before analysis is commenced.

The relatively small size of the fluid samples and microchannels in microfluidic analytical devices can, however, render such control problematic. For example, microchannels and surrounding structures (e.g., substrate(s) and electrode(s)) can suffer from a lack of unified structural integrity such that the microchannels are not adequately liquid and/or air tight.

In addition, microfluidic analytical devices often employ electrodes for a variety of purposes including analyte determination and fluid sample control (e.g., fluid sample position detection and fluid sample transportation). However, the electrodes employed in microfluidic analytical devices are relatively small and can be fragile in nature. As a consequence, the electrodes are susceptible to incomplete or weak electrical contact resulting in the creation of spurious and/or deleterious signals during operation.

Still needed in the field, therefore, are materials that can be employed in the manufacturing of an analytical devices that provide for a robust and secure electrical connection to electrodes within the analytical devices. Moreover, the materials should provide for any microchannels within the analytical device to be essentially liquid and/or air tight.

SUMMARY OF THE INVENTION

Fusible conductive inks according to embodiments of the present invention can be employed in the manufacturing of microfluidic systems such that a robust and secure electrical connection to electrodes within the microfluidic systems is provided. Furthermore, the fusible inks can also be employed to provide for microchannels within the microfluidic systems to be liquid and/or air tight.

Fusible conductive inks according to embodiments of the present invention include micronised powder containing platinum and carbon, poly(bisphenol A-co-epichlorohydrin)-glycidyl end capped polymer and a solvent. In addition, the ratio of micronised powder to poly(bisphenol A-co-epichlorohydrin)-glycidyl end capped polymer is in the range of 3:1 to 1:3.

Fusible conductive inks according to the present invention can be employed in the manufacturing of microfluidic systems to form electrodes, electrically conductive traces and/or electrically conductive contact pads. In addition, since the fusible conductive inks are fusible, electrodes and electrically conductive traces formed from the inks can be fused with insulating substrates and laminate layers to aid in the formation of liquid and/or air tight microchannels. Furthermore, electrically conductive traces formed from the inks can be fused with electrically conductive contact pads to provide a secure and robust electrical connection between the electrically conductive contact pads and an electrode via the electrically conductive trace.

BRIEF DESCRIPTION OF THE DRAWINGS

A better understanding of the features and advantages of the present invention will be obtained by reference to the following detailed description that sets forth illustrative embodiments, in which principles of the invention are utilized, and the accompanying drawings, of which:

FIGS. 9A and 9B are cross-sectional views illustrating steps in the method of FIG. 8.

DETAILED DESCRIPTION OF PREFERRED EMBODIMENTS

To be consistent throughout the present specification and for clear understanding of the present invention, the following definitions are hereby provided for terms used therein:

The term "fused" refers to the state of having been united by, or as if by, melting together.

The term "fusing" refers to the act of becoming united by, or as if by, melting together.

Figure 1:
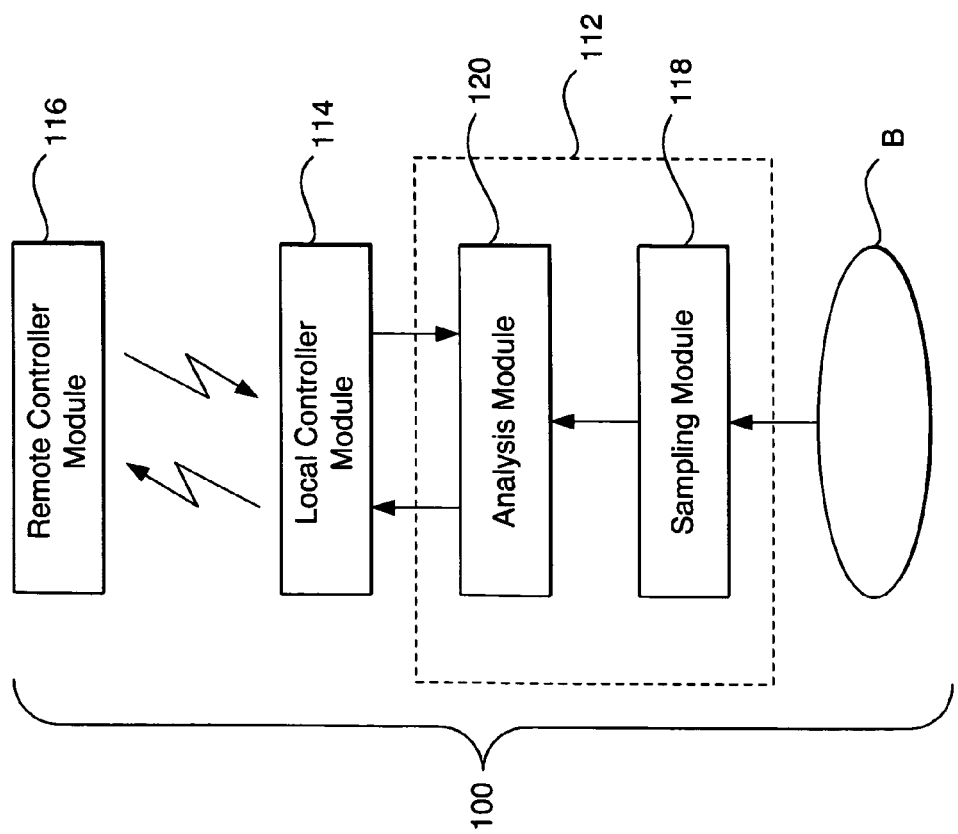
FIG. 1 is a simplified block diagram depicting a system for extracting a bodily fluid sample and monitoring an analyte therein with which embodiments of microfluidic analytical systems according to the present invention can be employed.

One skilled in the art will recognize that microfluidic analytical systems according to embodiments of the present invention can be employed, for example, as a subsystem in a variety of analytical devices. For example, embodiments of the present invention can be employed as an analysis module of system 100 depicted in FIG. 1. System 100 is configured for extracting a bodily fluid sample (e.g., an ISF sample) and monitoring an analyte (e.g., glucose) therein. System 100 includes a disposable cartridge 112 (encompassed within the dashed box), a local controller module 114 and a remote controller module 116.

In system 100, disposable cartridge 112 includes a sampling module 118 for extracting the bodily fluid sample (namely, an ISF sample) from a body (B, for example, a user's skin layer) and an analysis module 120 for measuring an analyte (i.e., glucose) in the bodily fluid. Sampling module 118 can be any suitable sampling module known to those of skill in the art, while analysis module 120 can be a microfluidic analytical system according to embodiments of the present invention. Examples of suitable sampling modules are described in International Application PCT/GB01/05634 (published as WO 02/49507 A1 on Jun. 27, 2002) and U.S. patent application Ser. No. 10/653,023, both of which are hereby fully incorporated by reference. However, in system 100, sampling module 118 is configured to be disposable since it is a component of disposable cartridge 112.

Figure 2:
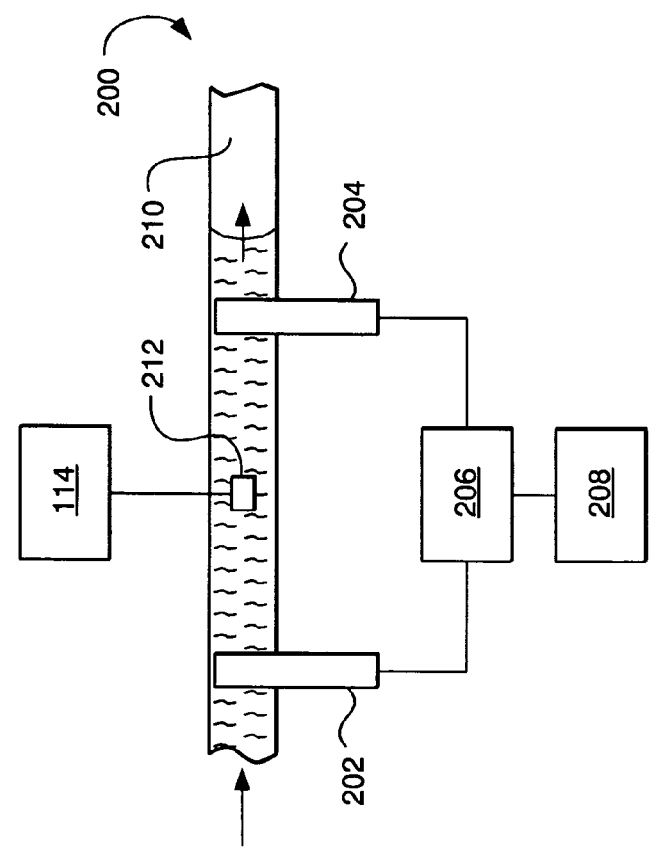
FIG. 2 is a simplified schematic diagram of a position electrode, microchannel, analyte sensor and meter configuration relevant to embodiments of microfluidic analytical systems according to the present invention.

FIG. 2 is a simplified schematic diagram of a position electrode, microchannel, analyte sensor and meter configuration 200 relevant to understanding microfluidic analytical systems according to the present invention. Configuration 200 includes first position electrode 202, second position electrode 204, electrical impedance meter 206, timer 208, microchannel 210 and analyte sensor 212. In the configuration of FIG. 2, wavy lines depict a fluid sample (e.g., an ISF, blood, urine, plasma, serum, buffer or reagent fluid sample) within microchannel 210.

Configuration 200 can be used to determine the position or flow rate of a fluid sample in microchannel 210. In the configuration of FIG. 2, analyte sensor 212 is located in-between first position electrode 202 and second position electrode 204. Electrical impedance meter 206 is adapted for measuring an electrical impedance between first position electrode 202 and second electrode 204. Such a measurement can be accomplished by, for example, employing a voltage source to impose either a continuous or alternating voltage between first position electrode 202 and second position electrode 204 such that an impedance resulting from a conducting path formed by a fluid sample within microchannel 210 and between first position electrode 202 and second position electrode 204 can be measured, yielding a signal indicative of the presence of the fluid sample.

Furthermore, when electrical impedance meter 206 measures a change in impedance due to the presence of a fluid sample between the first and second position electrodes, a signal can be sent to timer 208 to mark the time at which liquid is first present between the first and second position electrodes. When the measured impedance indicates that the fluid sample has reached the second position electrode, another signal can be sent to timer 208. The difference in time between when a fluid sample is first present between the first and second position electrodes and when the fluid sample reaches the second position electrode can be used to determine fluid sample flow rate (given knowledge of the volume of microchannel 210 between the first and second position electrodes). Furthermore, knowledge of fluid sample flow rate and/or fluid sample position can be used to determine total fluid sample volume. In addition, a signal denoting the point in time at which a fluid sample arrives at second position electrode 204 can also be sent to a local controller module (e.g., local controller module 114 of FIGS. 1 and 2) for operational use.

Further descriptions of microfluidic analytical devices with which microfluidic analytical systems according to embodiments of the present invention can be utilized are included in U.S. patent application Ser. No. 10/811,446, which is hereby fully incorporated by reference.

Figure 3:
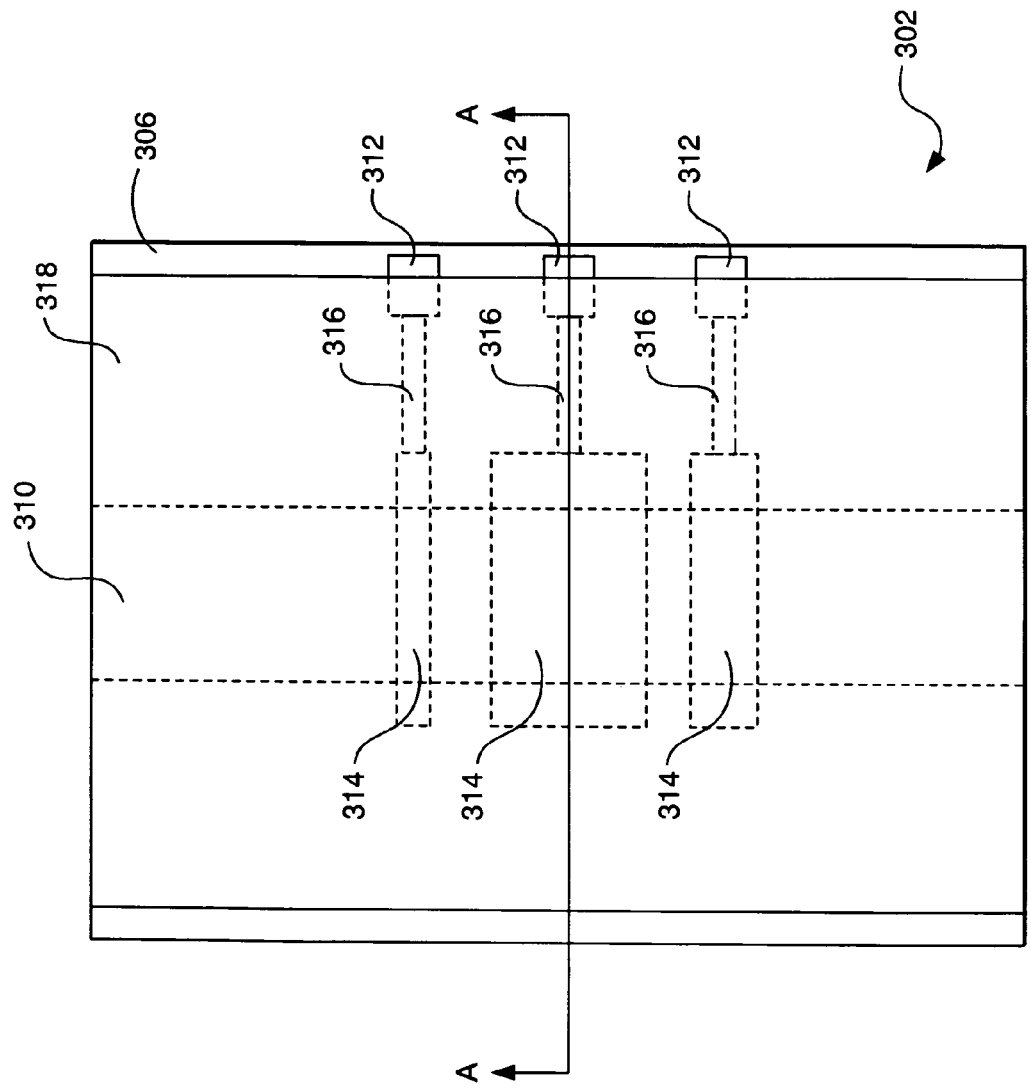
FIG. 3 is a simplified top view (with dashed lines indicating hidden elements) of an analysis module of a microfluidic analytical system according to an exemplary embodiment of the present invention.
Figure 4:
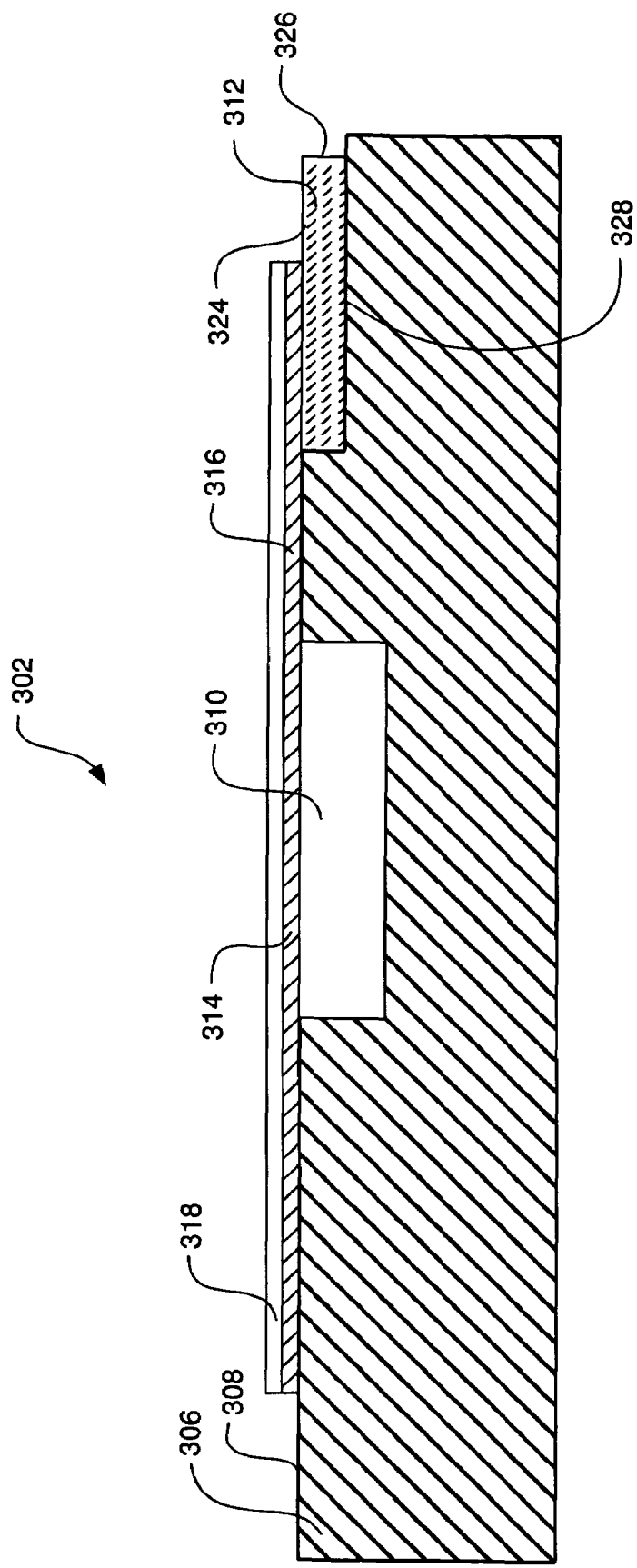
FIG. 4 is a simplified cross-sectional view of the analysis module of FIG. 3 taken along line A-A of FIG. 3.
Figure 5:
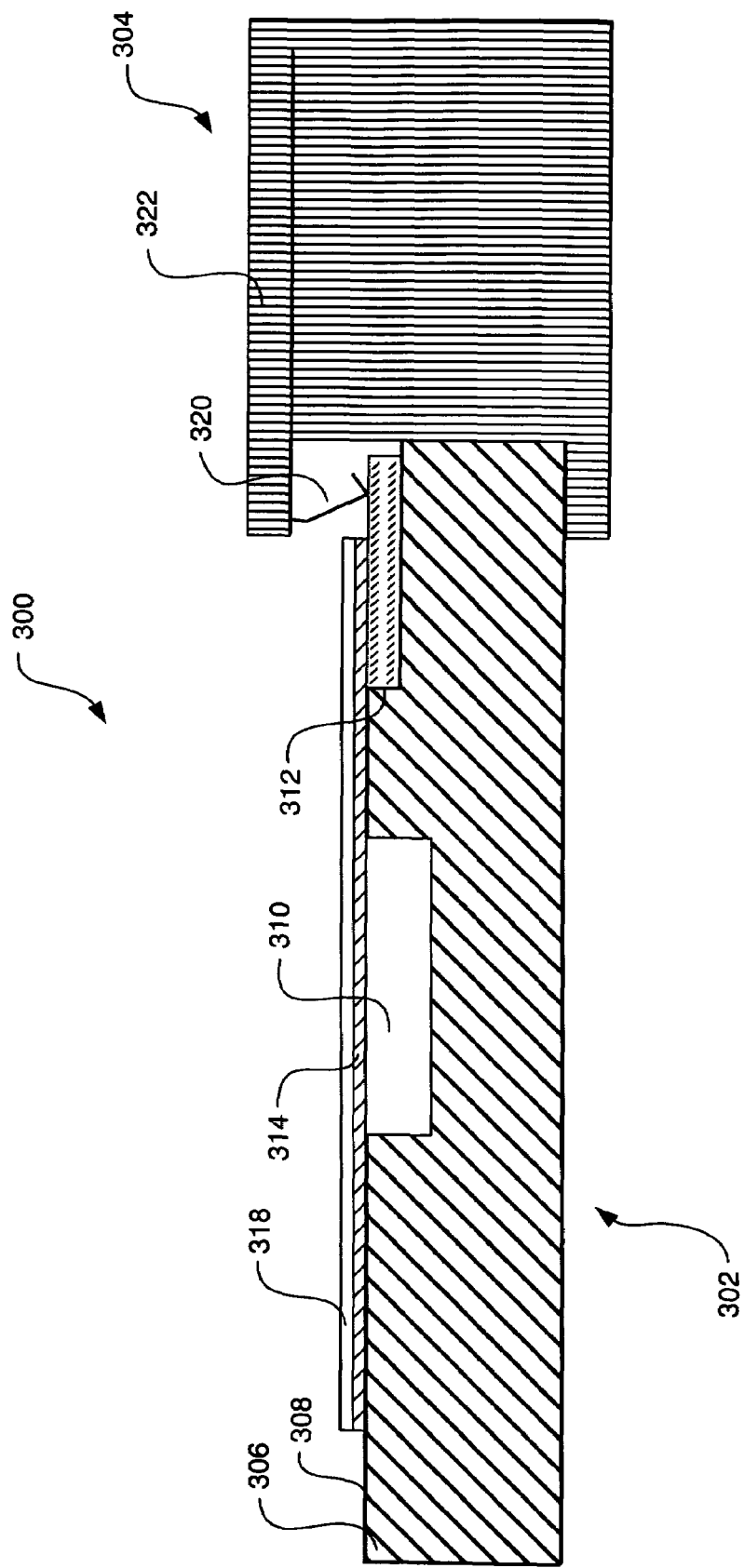
FIG. 5 is a simplified cross-sectional view of the analysis module of FIG. 3 in electrical connection with an electrical device of the microfluidic analytical system.

FIGS. 3, 4 and 5 are simplified depictions of a microfluidic analytical system 300 for monitoring an analyte in a fluid sample according to an exemplary embodiment of the present invention. Microfluidic analytical system 300 includes an analysis module 302 and an electrical device 304 (e.g., a meter and/or power supply).

Analysis module 302 includes an insulating substrate 306 with an upper surface 308. Upper surface 308 has microchannel 310 therein. Analysis module 302 also includes three electrically conductive contact pads 312 disposed on the upper surface of insulating substrate 306, three electrodes 314 disposed over microchannel 310, electrically conductive traces 316 connected to each electrode 314 and to each electrically conductive contact pad 312 and a laminate layer 318. Laminate layer 318 is disposed over electrodes 314, electrically conductive traces 316, and a portion of the upper surface 308 of insulating substrate 306.

Electrical device 304 includes three spring contacts 320 (one of which is illustrated in FIG. 5) and a chassis 322 (see FIG. 5). Electrically conductive contact pads 312 of microfluidic analytical system 300 have accessible exposed surfaces 324 and 326 that provide for electrical connection to electrical device 304 via spring contacts 320.

Insulating substrate 306 can be formed from any suitable material known to one skilled in the art. For example, insulating substrate 306 can be formed from an insulating polymer such as polystyrene, polycarbonate, polymethylmethacrylate, polyester and any combinations thereof. To enable electrical connection between the electrical device and the electrically conductive contact pads, it is particularly beneficial for the insulating substrate to be essentially non-compressible and have sufficient stiffness for insertion into the electrical device. Insulating substrate 306 can be of any suitable thickness with a typical thickness being approximately 2 mm.

Electrically conductive contact pads 312 can be formed from any suitable electrically conductive material known to one skilled in the art including, for example, conductive inks as described below and conductive pigment materials (e.g., graphite, platinum, gold, and silver loaded polymers that are suitable for use in injection molding and printing techniques).

The electrically conductive contact pads can be any suitable thickness. However, to enable a secure and robust connection to the electrical device, an electrically conductive contact pad thickness in the range of from 5 microns to 5 mm is beneficial, with a thickness of approximately 50 microns being preferred. In this regard, it should be noted that the thickness of the electrically conductive contact pads can be significantly thicker than the electrodes or electrically conductive traces, thus enabling a secure and robust electrical connection between the electrodes and the electrical device (via the electrically conductive traces and the electrically conductive contact pads) while simultaneously providing for the electrodes and electrically conductive traces to be relatively thin.

Electrodes 314 and electrically conductive traces 316 can also be formed from any suitable conductive material including, but not limited to, conductive materials conventionally employed in photolithography, screen printing and flexo-printing techniques. Carbon, noble metals (e.g., gold, platinum and palladium), noble metal alloys, as well as potential-forming metal oxides and metal salts are examples of components that can be included in materials for the electrodes and electrically conductive traces. Conductive ink (e.g., silver conductive ink commercially available as Electrodag® 418 SS from Acheson Colloids Company, 1600 Washington Ave, Port Huron Mich. 48060, U.S.A.) can also be employed to form electrodes 314 and electrically conductive traces 316. The typical thickness of electrodes 314 and conductive traces 316 is, for example, 20 microns.

For the circumstance of multiple electrodes, each electrode can be formed using the same conductive ink, such as the conductive ink described in International Patent Application PCT/US97/02165 (published as WO97/30344 on Aug. 21, 1997) or from different conductive inks that provide desirable and various characteristics for each of the electrodes.

Laminate layer 318 can also be formed from any suitable material known in the art including, but not limited to, polystyrene, polycarbonate, polymethyl-methacrylate and polyester. Manufacturing of microfluidic analytical systems according to embodiments of the present invention can be simplified when laminate layer 318 is in the form of a pliable and/or flexible sheet. For example, laminate layer 318 can be a pliable sheet with a thickness in the range of from about 5 µm to about 500 µm. In this regard, a laminate thickness of approximately 50 µm has been found to be beneficial with respect to ease of manufacturing. Laminate layer 318 will typically be thinner than insulating substrate 306 and be sufficiently thin that heat can be readily transferred through laminate layer 318 to insulating substrate 306 during the manufacturing of analysis module 302.

An essentially liquid and/or air tight microchannel can be achieved in microfluidic analytical system 300 when (i) laminate layer 318 is fused with the portion of the upper surface 308 of the insulating substrate 306 such that microchannels 310 are essentially liquid and/or air tight, and/or (ii) having electrodes 314 and/or electrically conductive traces 316 fused with the upper surface 308 of insulating substrate 306 such that microchannels 310 are essentially liquid and/or air tight. Exemplary methods of achieving such fused structures are described in detail below.

Figure 6:
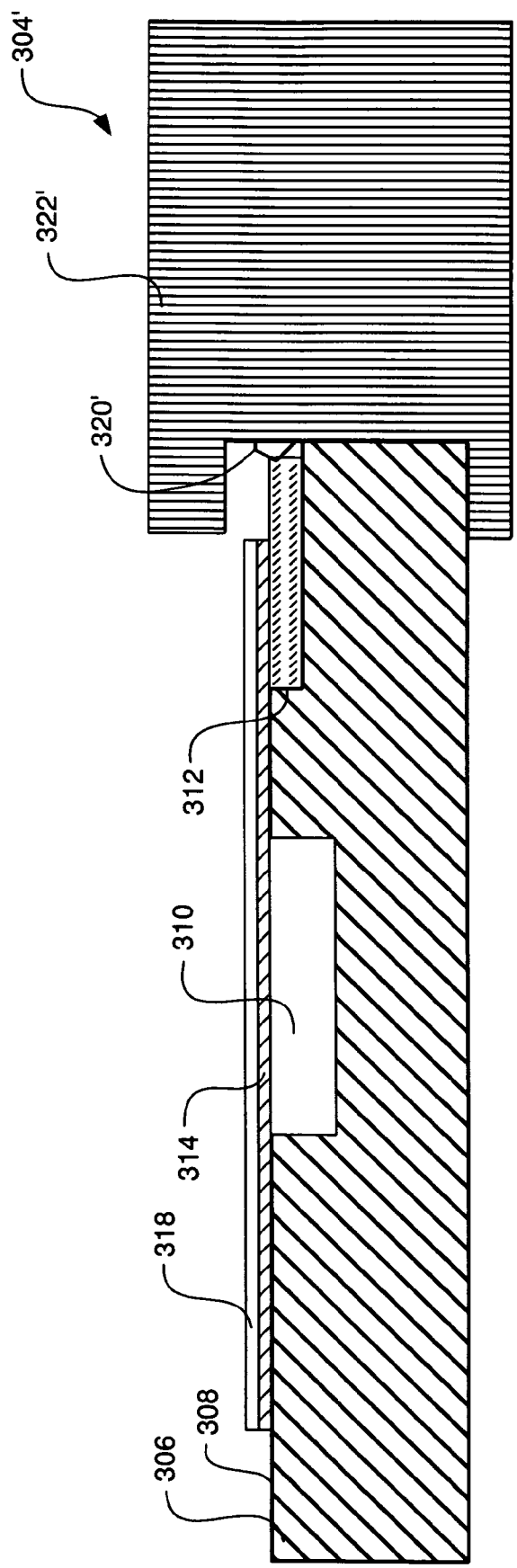
FIG. 6 is a simplified cross-sectional view of the analysis module of FIG. 3 in electrical connection with a portion of an alternative electrical device.

FIG. 6 depicts analysis module 302 of microfluidic analytical system 300 connected with an alternative electrical device 304' that includes three spring contact 320' (one of which is illustrated in FIG. 6) and a chassis 322' (see FIG. 6). FIG. 6 illustrates spring contact 320' connected with accessible exposed surface 326.

Figure 7:
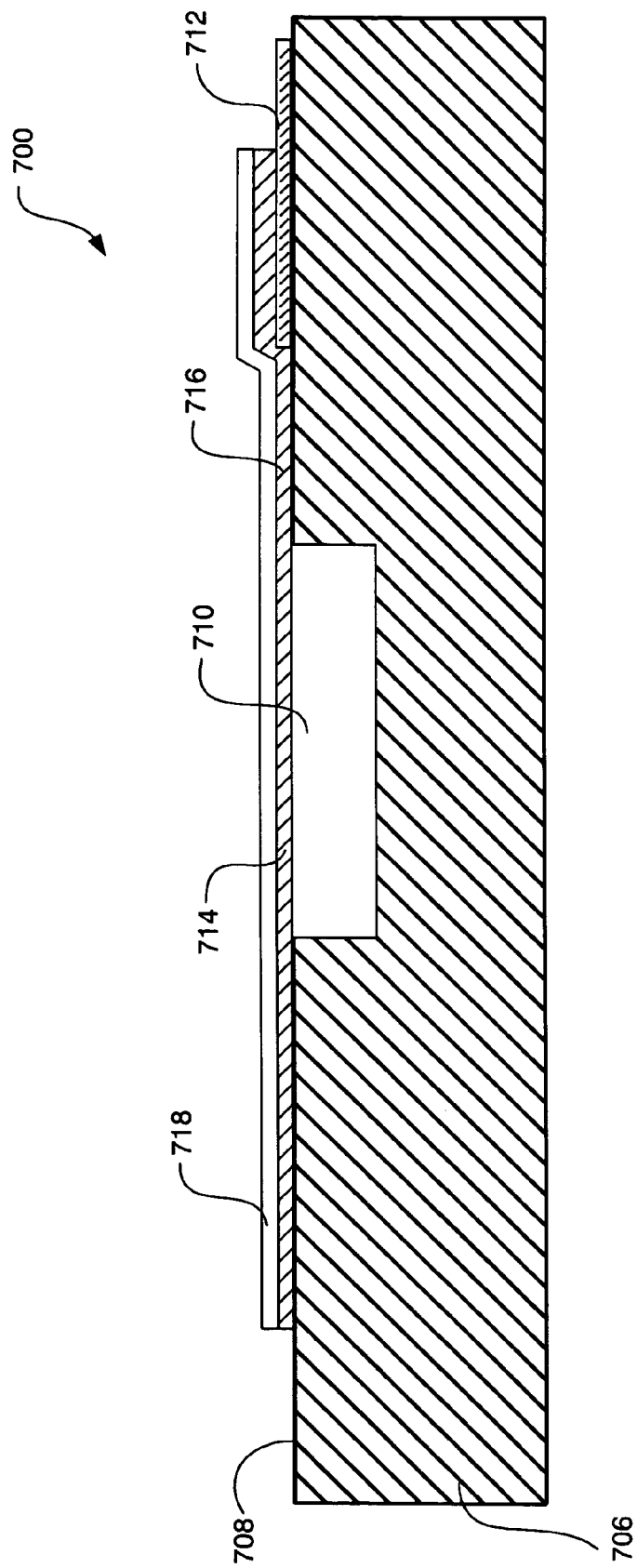
FIG. 7 is a simplified cross-sectional view of another analysis module of a microfluidic analytical system according to the present invention.

In the embodiment of FIGS. 3, 4, 5 and 6, electrically conductive contact pads 312 are disposed in a recess 328 of upper surface 308. By locating electrically conductive contact pads 312 in a recess on the upper surface of insulating substrate 306, electrically conductive contact pads 312 can be easily formed with a thickness that is greater than the thickness of the electrode(s) and electrically conductive contact pads, thus enabling a robust and secure connection to an electrical device from either of a top surface (such as accessible exposed surface 324) or a side surface (e.g., accessible exposed surface 326) of the electrically conductive contact pad. However, FIG. 7 depicts an alternative configuration wherein the electrically conductive contact pad is disposed on an essentially planar upper surface of the insulating substrate. FIG. 7 depicts an analysis module 700 of a microfluidic analytical system according to the present invention. Analysis module 700 includes an insulating substrate 706 with an upper surface 708. Upper surface 708 has microchannel 710 therein.

Analysis module 700 also an has electrically conductive contact pad 712 disposed on the upper surface of insulating substrate 706, an electrode 714 disposed over microchannel 710, an electrically conductive trace 716 connected to electrode 714 and electrically conductive contact pad 712 and a laminate layer 718. Laminate layer 718 is disposed over electrode 714, electrically conductive trace 716, and a portion of the upper surface 708 of insulating substrate 706.

Once apprised of the present disclosure, one skilled in the art will recognize that the analysis module of microfluidic analytical systems according to the present invention can include a plurality of micro-channels, a plurality of electrodes (e.g., a plurality of working electrodes and reference electrodes), a plurality of electrically conductive traces and a plurality of electrically conductive contact pads. In addition, the insulating substrate and laminate layer can be any suitable shape. For example, the insulating substrate and laminate layer can be circular in shape with the electrically conductive contact pad(s) being disposed at the periphery of such a circular insulating substrate.

Figure 8:
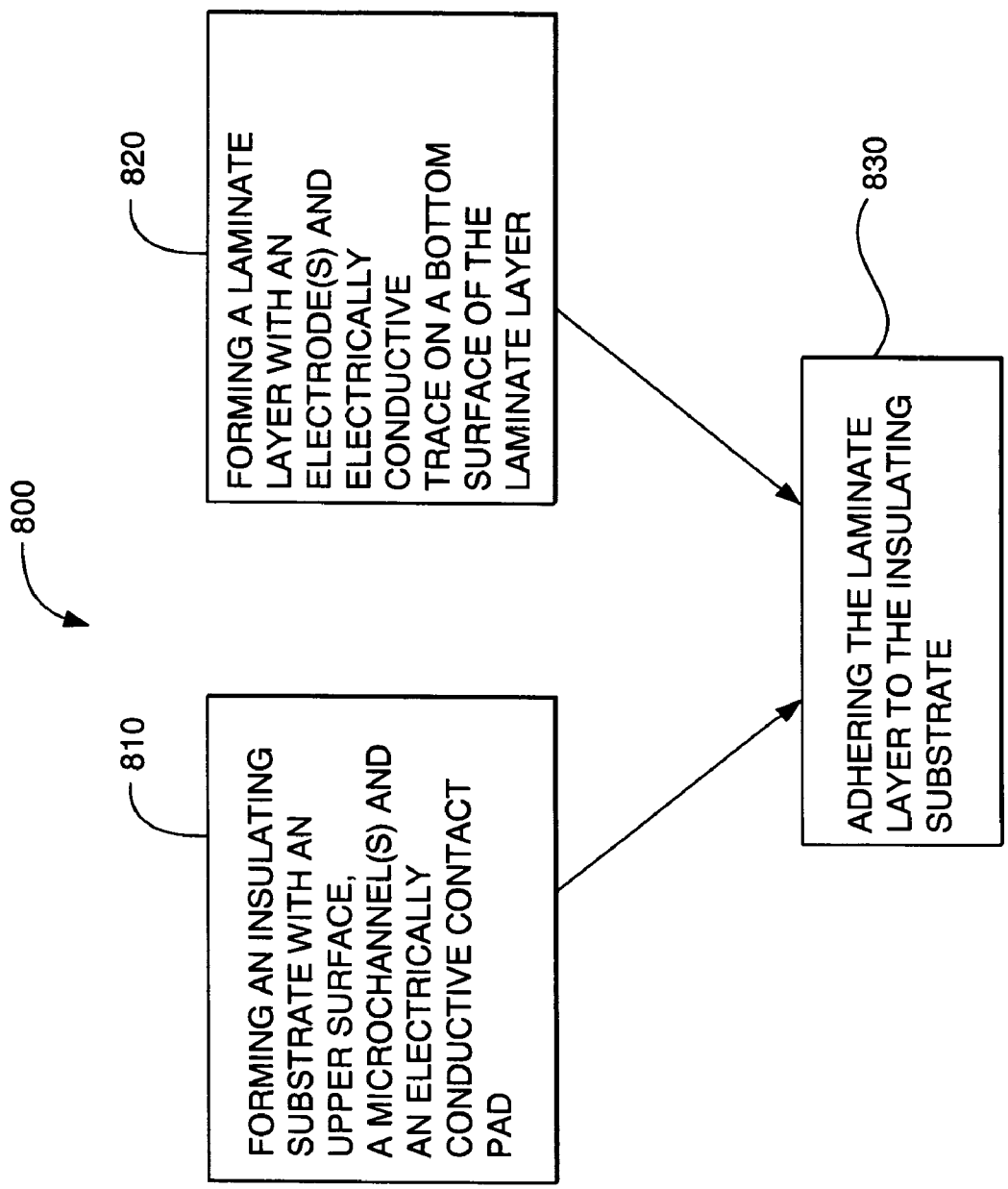
FIG. 8 is a flow chart depicting an embodiment of a method in accordance with the present invention.

FIG. 8 is a flow chart depicting stages in a process 800 for manufacturing an analysis module with an accessible electrically conductive contact pad for a microfluidic system. Process 800 includes forming an insulating substrate with an upper surface, at least one microchannel within the upper surface, and at least one electrically conductive contact pad disposed on the upper surface, as set forth in step 810. FIG. 9A depicts the result of such a forming step as represented by insulating substrate 950, upper surface 952 of insulating substrate 950, microchannel 954 and electrically conductive contact pad 956.

Any suitable technique(s) can be used to conduct step 810. For example, microchannels can be formed in the upper surface of an insulating substrate by the use of etching techniques, ablation techniques, injection moulding techniques or hot embossing techniques. For the circumstance that an injection moulding technique is employed, insulating polymeric materials (which are known to flow well into moulds under conditions of elevated temperature and pressure) can be employed. Examples of such insulating polymeric materials include, but are not limited to, polystyrene, polycarbonate, polymethylmethacrylate and polyester. Furthermore, the electrically conductive contact pads can be formed using, for example, screen printing of conductive inks or co-moulding of the electrically conductive contact pads during formation of the insulating substrate.

As set forth in step 820 of FIG. 8, a laminate layer with at least one electrode and at least one electrically conductive trace disposed on a bottom surface of the laminate layer is produced. FIG. 9A also depicts the result of such a production step as represented by laminate layer 958, electrode 960 and conductive trace 962. The electrode(s) and electrically conductive trace(s) can be formed on the laminate layer by, for example, any suitable conductive ink printing technique known to one skilled in the art.

Subsequently, at step 830 of process 800, the laminate layer is adhered to the insulating substrate such that:
  (i) at least a portion of the bottom surface of the laminate layer is adhered to at least a portion of the upper surface of the insulating substrate;
  (ii) the electrode(s) is exposed to at least one microchannel;
  (iii) each of the electrically conductive traces is electrically contacted to at least one electrically conductive contact pad, and
  (iv) at least one surface of the electrically conductive contact pad remains exposed and accessible for electrical connection. FIG. 9B depicts the resultant structure of step 830.

During adhering step 830, the laminate layer can be fused with the portion of the upper surface of the insulating substrate such that the at least one microchannel is essentially liquid tight and, alternatively, also essentially air tight. Such fusing can be achieved by application of sufficient heat and/or pressure to cause localized softening and/or melting of the laminate layer and insulating substrate. The application of heat and/or pressure can be achieved, for example, via heated rollers. It is postulated, without being bound, that such fusing is due to a physical adhesion and not a chemical bond and that the fusing is a result of surface wetting between the molten states of the laminate layer and insulating layer material(s), and "mechanical keying" in the solid state. Mechanical keying refers to the bonding of two material surfaces via a mechanism that involves the physical penetration of one material into voids that are present in, or developed in, the second material.

To enable fusing and the creation of a liquid tight and/or air tight microchannel, the melting characteristics of the laminate layer and insulating substrate must be predetermined. For example, it can be beneficial for the surface of the laminate layer and insulating substrate to become molten at essentially the same time during the adhering step in order that efficient wetting of the interface between the laminate layer and insulating layer can occur followed by flowing and intermingling of the molten portions of the layers. Subsequent cooling produces a laminate layer that is fused to the portion of the insulating layer above which the laminate layer is disposed in a manner that produces a liquid tight and/or air tight microchannel.

For the circumstance where both the laminate layer and the insulating layer are formed of polystyrene, fusing can occur, for example, at a pressure of 5 Bar and a temperature of 120° C. for 3 seconds. To further enhance the creation of a liquid tight and, alternatively, air tight microchannel, the adhering step can also be conducted such that the electrically conductive traces and/or electrodes are fused with the upper surface of the insulating substrate. In such a circumstance, the material from which the electrically conductive traces (and/or electrodes) are formed is predetermined such that the material fuses with the insulating layers under the same conditions of pressure, temperature and time as for the fusing of the laminate layer and insulating layer. However, the material from which the electrically conductive traces (and/or electrodes) is formed must not lose significant definition during the adhering step.

In addition, to enhance the electrical connection between the electrically conductive traces and the electrically conductive contact pads, the electrically conductive traces and electrically conductive contact pads can be formed of materials (e.g., materials with an excess of conductive pigment) that become fused during the adhering step. However, an electrical connection between the electrically conductive traces and electrically conductive contact pads can also be formed by physical mechanical contact established during the adhering step.

Typical conditions for the adhering step are, for example, a temperature in the range of 80° C. to 200° C., a pressure in the range from about 0.5 Bar to about 10 Bar and a duration of from about 0.5 seconds to about 5 seconds.

EXAMPLE

Manufacturing of an Analysis Module

An embodiment of a microfluidic analytical device according to the present invention was manufactured using an insulating substrate formed from a polystyrene material (i.e., Polystyrol 144C, commercially available from BASF, Aktiengesellschaft, Business Unit Polystyrene, D-67056 Ludwigshafen, Germany) and a laminate layer formed from another polystyrene material (i.e., Norflex® Film, commercially available from NSW Kunststofftechnik, Norddeutsche Seekabelwerke AG, 26954 Nordenham, Germany).

Electrodes and electrically conductive traces were printed on the laminate layer using a conductive ink. In addition, electrically conductive contact pads were printed on the insulating substrate using the same conductive ink. The conductive ink used to print the electrically conductive traces, electrically conductive contact pads and electrodes had the following mass percent composition:

18.5% micronised powder containing platinum and carbon in a 1:9 mass ratio (e.g., MCA 20V platinized carbon available from MCA Services, Unit 1A Long Barn, North End, Meldreth, South Cambridgeshire, SG8 6NT, U.K);

19.0% poly(bisphenol A-co-epichlorohydrin)-glycidyl end capped polymer (e.g., Epikote™ 1055, available from Resolution Enhanced Products, Resolution Europe BV, PO Box 606, 3190 AN Hoogvliet Rt, The Netherlands); and 62.5% Methyl Carbitol (Diethylene Glycol Monomethyl Ether) solvent (obtained from Dow Benelux B.V., Prins Boudewijnlaan 41, 2650 Edegem, Belgium).

The conductive ink composition detailed immediately above is particularly beneficial for use with a polystyrene laminate layer and a polystyrene insulating substrate (as described below). However, in general, the composition can be varied while keeping the mass ratio of micronised powder to polymer in the range of about 3:1 to 1:3.

Once apprised of the present disclosure, one skilled in the art will recognize that the percent of solvent in the conductive ink can be varied to suit the technique used to apply the conductive ink to a laminate layer and/or insulating substrate (e.g., spray coating, hot embossing, and flexographic printing). Furthermore, any suitable solvent can be substituted for Methyl Carbitol (Diethylene Glycol Monomethyl Ether) including, for example, alcohols, methyl ethyl ketone, butyl glycol, benzyl acetate, ethylene glycol diacetate, isophorone, and aromatic hydrocarbons.

The insulating substrate was subsequently adhered to the laminate layer under conditions of applied temperature and pressure such that softening and fusing of the laminate layer and insulating layer occurred. The temperature and pressure were applied to the laminate layer and insulating substrate by passing the laminate layer and insulating substrate through heated rollers at a rate in the range of 30 mm/sec to 3 mm/sec.

Furthermore, the temperature and pressure were sufficient to cause softening of the conductive ink and a fusing between the conductive ink and the insulating substrate and fusing between the conductive ink and the laminate layer. Despite such softening and fusing, the conductive ink retained its conductive properties. Therefore, the conductive ink is also referred to as a fusible conductive ink.

Temperatures employed during the adhering step were typically within the range 80° C. to 150° C., and particularly about 120° C. and pressures typically between 1 bar and 10 bar, and particularly about 5 bar.

The adhering step created liquid tight microchannels with no gaps between any points of physical contact between the insulating substrate, laminate layer and conductive ink.

To facilitate optimum fusing it is desirable that the melting point of the conductive ink be within the range +30° C. to −50° C. relative to the melting point of the laminate layer and insulating substrate. Furthermore, it is more desirable that the melting range of the conductive ink be 0° C. to −30° C. relative the melting point of the substrate and preferably the melting range of the ink will be between −5° C. and −15° C.

relative to the melting point of the substrate. In this regard, it should be noted that the reported melting point range for Epikote 1055 is between 79° C. and 87° C. and that the melting point of the polystyrene from which the laminate layer and insulating substrate were formed is 90° C.

Furthermore, to facilitate fusing between components formed from a conductive ink (e.g., electrodes, electrically conductive traces and electrically conductive contact pads) and an insulating substrate or laminate layer, it can be beneficial to employ a conductive ink that includes components with a molecular weight that are lower than the molecular weight of a polymeric material from which the insulating substrate and laminate layer may be are formed.

It should be understood that various alternatives to the embodiments of the invention described herein may be employed in practicing the invention. It is intended that the following claims define the scope of the invention and that structures within the scope of these claims and their equivalents be covered thereby.

That which is claimed is:

1. A fusible conductive ink for use in manufacturing microfluidic analytical system, the fusible conductive ink consisting essentially of:

micronised powder containing platinum and carbon;
 poly(bisphenol A-co-epichlorohydrin)-glycidyl end capped polymer; and
 a solvent,
 wherein the ratio of micronised powder to poly(bisphenol A-co-epichlorohydrin)-glycidyl end capped polymer is in the range of 3:1 to 1:3.

2. The fusible conductive ink of claim 1, wherein the micronised powder contains platinum and carbon in a mass ratio of approximately 1:9.

3. The fusible conductive ink of claim 1, wherein the solvent is Methyl Carbitol (Diethylene Glycol Monomethyl Ether).

4. The fusible conductive ink of claim 1, wherein the fusible conductive ink has a mass percent composition as follows:

18.5% micronised powder containing platinum and carbon in a 1:9 mass ratio;
 19.0% poly (bisphenol A-co-epichlorohydrin)-glycidyl end capped polymer; and
 62.5% Methyl Carbitol (Diethylene Glycol Monomethyl Ether) solvent.

* * * * *